US009658479B2

(12) United States Patent
Wurzel et al.

(10) Patent No.: US 9,658,479 B2
(45) Date of Patent: May 23, 2017

(54) ELECTRONIC DEVICE WITH DISPLAY BACKLIGHT UNIT AND DISPLAY ASSEMBLY

(71) Applicant: Apple Inc., Cupertino, CA (US)

(72) Inventors: Joshua G. Wurzel, Sunnyvale, CA (US); David A. Doyle, San Francisco, CA (US); Shawn R. Gettemy, San Jose, CA (US); Wey-Jiun Lin, Los Altos Hills, CA (US)

(73) Assignee: Apple Inc., Cupertino, CA (US)

( * ) Notice: Subject to any disclaimer, the term of this patent is extended or adjusted under 35 U.S.C. 154(b) by 589 days.

(21) Appl. No.: 14/104,298

(22) Filed: Dec. 12, 2013

(65) Prior Publication Data
US 2014/0211122 A1   Jul. 31, 2014

Related U.S. Application Data

(60) Provisional application No. 61/759,153, filed on Jan. 31, 2013.

(51) Int. Cl.
*G02F 1/1335* (2006.01)
*G02F 1/1333* (2006.01)

(52) U.S. Cl.
CPC .......... *G02F 1/133308* (2013.01); *G02F 2001/133317* (2013.01); *G02F 2001/133322* (2013.01); *G02F 2201/54* (2013.01)

(58) Field of Classification Search
CPC ... G02F 1/133308; G02F 2001/133317; G02F 2001/133322

USPC ............................................. 349/61
See application file for complete search history.

(56) References Cited

U.S. PATENT DOCUMENTS

| | | | |
|---|---|---|---|
| 6,246,459 B1 * | 6/2001 | Simhambhatla .. | G02F 1/133308 349/149 |
| 6,621,004 B2 * | 9/2003 | Cheynet ............... | H05K 5/0017 174/50 |
| 8,523,408 B2 | 9/2013 | Lin et al. | |
| 2004/0021630 A1 * | 2/2004 | Lai ..................... | G02F 1/133308 345/102 |
| 2005/0024551 A1 * | 2/2005 | Battles .............. | G02F 1/133308 349/58 |
| 2005/0062899 A1 * | 3/2005 | Fukayama ........ | G02F 1/133308 349/58 |
| 2006/0250820 A1 | 11/2006 | Kuo | |
| 2007/0046859 A1 | 3/2007 | Huang et al. | |

(Continued)

*Primary Examiner* — Lucy Chien
(74) *Attorney, Agent, or Firm* — Treyz Law Group, P.C.; G. Victor Treyz; Zachary D. Hadd

(57) ABSTRACT

An electronic device may be provided with electrical components mounted in an electronic device housing. A display module may be attached to a display cover layer with a layer of adhesive to form a display module assembly. The display module assembly may include a display module assembly chassis. The display module assembly chassis may include a plastic display module assembly chassis molded over a metal display module assembly chassis. The display module assembly and a backlight unit may be assembled to form a display module that is installed within the electronic device housing or display module assembly layers and backlight unit structures may be assembled into the electronic device housing. The backlight unit may include a backlight unit chassis. A metal housing midplate may serve as part of the backlight unit chassis.

19 Claims, 3 Drawing Sheets

(56) References Cited

U.S. PATENT DOCUMENTS

| | | | |
|---|---|---|---|
| 2008/0204624 A1 | 8/2008 | Fu | |
| 2009/0128731 A1* | 5/2009 | Kwon | G02F 1/133608 349/58 |
| 2009/0185100 A1* | 7/2009 | Matsuhira | G02F 1/133308 349/58 |
| 2010/0177259 A1* | 7/2010 | Ichioka | G02F 1/133308 349/58 |
| 2010/0265431 A1* | 10/2010 | Li | G02F 1/133308 349/59 |
| 2011/0019351 A1* | 1/2011 | Bayne | G02F 1/133308 361/679.01 |
| 2013/0063978 A1 | 3/2013 | Gettemy et al. | |

* cited by examiner

ELECTRONIC DEVICE WITH DISPLAY BACKLIGHT UNIT AND DISPLAY ASSEMBLY

This application claims priority to U.S. provisional patent application No. 61/759,153 filed Jan. 31, 2013, which is hereby incorporated by reference herein in its entirety.

BACKGROUND

This relates generally to electronic devices and, more particularly, to electronic devices with displays.

Electronic devices often have displays. Displays may be protected using cover glass layers. For example, a cover glass layer may be attached to the front of a liquid crystal display module to prevent layers in the liquid crystal display module from becoming damaged. A backlight unit that provides the liquid crystal display module with backlight is attached to the liquid crystal display module with a strip of adhesive. During assembly, the liquid crystal display module and the attached display cover layer and backlight unit may be mounted within a device housing. The housing may be strengthened using a metal midplate that is separated from the backlight unit by an air gap.

Challenges arise when mounting components such as display components in an electronic device. If care is not taken, the display components may be overly bulky or may be characterized by excessively wide inactive border regions.

It would therefore be desirable to be able to provide electronic devices with improved display arrangements.

SUMMARY

An electronic device may be provided with electrical components mounted in an electronic device housing. The electronic device may have a display such as a liquid crystal display. The liquid crystal display may be formed from a liquid crystal display module having polarizers, a thin-film transistor layer, a color filter layer, and a layer of liquid crystal material.

The display module may be attached to a display cover layer with a layer of adhesive to form a display module assembly. The display module assembly may include a display module assembly chassis. The display module assembly chassis may include a plastic display module assembly chassis molded over a metal display module assembly chassis.

The display module assembly and a separate backlight unit may be assembled to form a display module. The display module may be installed within the electronic device housing attachment mechanisms such as welds or fasteners. Display module assembly layers and backlight unit structures may also be assembled directly into the electronic device housing without forming the display module.

The backlight unit may include a backlight unit chassis. The backlight unit chassis may have plastic portions molded over metal portions. The metal portions may be used in forming structural elements for the electronic device housing. For example, the metal backlight unit chassis portions may be formed from a metal housing midplate that serves both as part of the backlight unit chassis and as a structural portion of the electronic device housing that resists twisting of the electronic device housing during use.

Further features, their nature and various advantages will be more apparent from the accompanying drawings and the following detailed description of the preferred embodiments.

DETAILED DESCRIPTION

Figure 1:
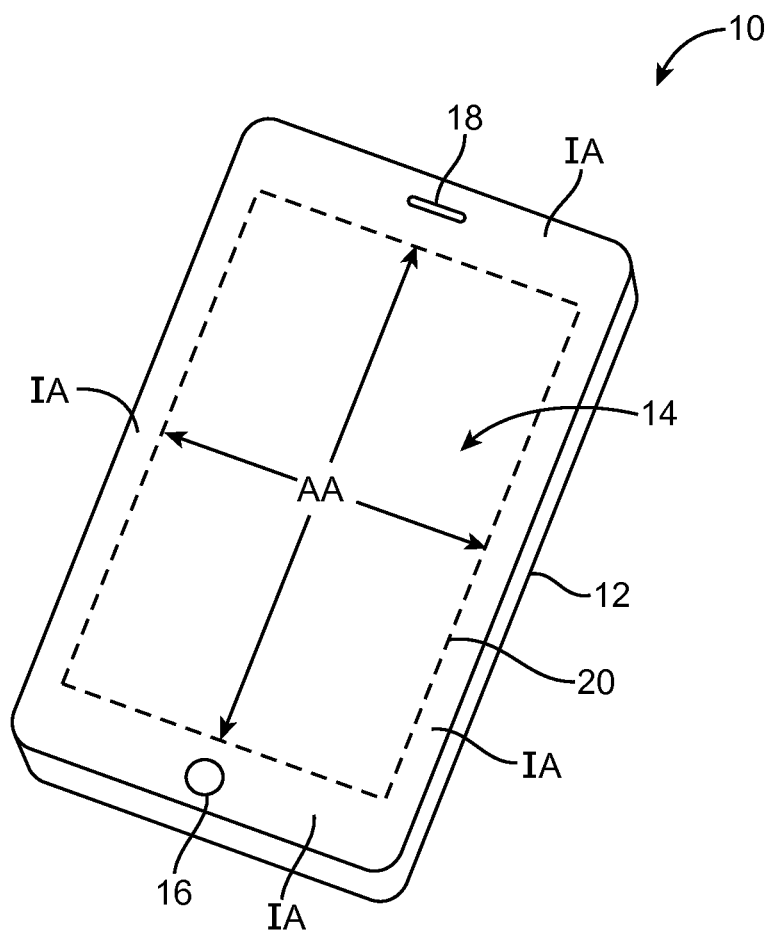
FIG. 1 is a perspective view of an illustrative electronic device of the type that may be provided with display structures in accordance with an embodiment of the present invention.

An illustrative electronic device that may be provided with a display is shown in FIG. 1. Electronic devices such as device 10 of FIG. 1 may be cellular telephones, media players, other handheld portable devices, somewhat smaller portable devices such as wrist-watch devices, pendant devices, or other wearable or miniature devices, gaming equipment, tablet computers, notebook computers, desktop computers, televisions, computer monitors, computers integrated into computer displays, or other electronic equipment.

In the example of FIG. 1, device 10 includes a display such as display 14. Display 14 has been mounted in a housing such as housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.).

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may include an array of display pixels formed from liquid crystal display (LCD) components, an array of electrophoretic display pixels, an array of electrowetting display pixels, or display pixels based on other display technologies. The brightness of display 14 may be adjustable. For example, display 14 may include backlight structures formed from a light source such as a lamp or light-emitting diodes that can be used to increase or decrease display backlight levels and thereby adjust display brightness.

Display 14 may be protected using a display cover layer such as a layer of transparent glass or clear plastic. Openings may be formed in the display cover layer. For example, an opening may be formed in the display cover layer to accommodate a button such as button 16. An opening may also be formed in the display cover layer to accommodate ports such as speaker port 18.

Display 14 may contain an array of active display pixels within rectangular region 20. This region may sometimes be referred to as the active area of the display. As shown in FIG. 1, active area AA may be surrounded by inactive display areas IA that do not contain any active display pixels. Inactive areas IA may be formed on the upper and lower edges of display 14 and/or on the right and left sides of display 14. In the FIG. 1 example, inactive areas IA form a rectangular ring-shaped region that surrounds the periphery of active display region AA. The display cover layer and/or other display layers in display 14 may be provided with opaque masking structures in the inactive region to hide internal components from view by a user. For example, the underside of a display cover layer in inactive region IA may be coated with a layer of black or white ink.

Figure 2:
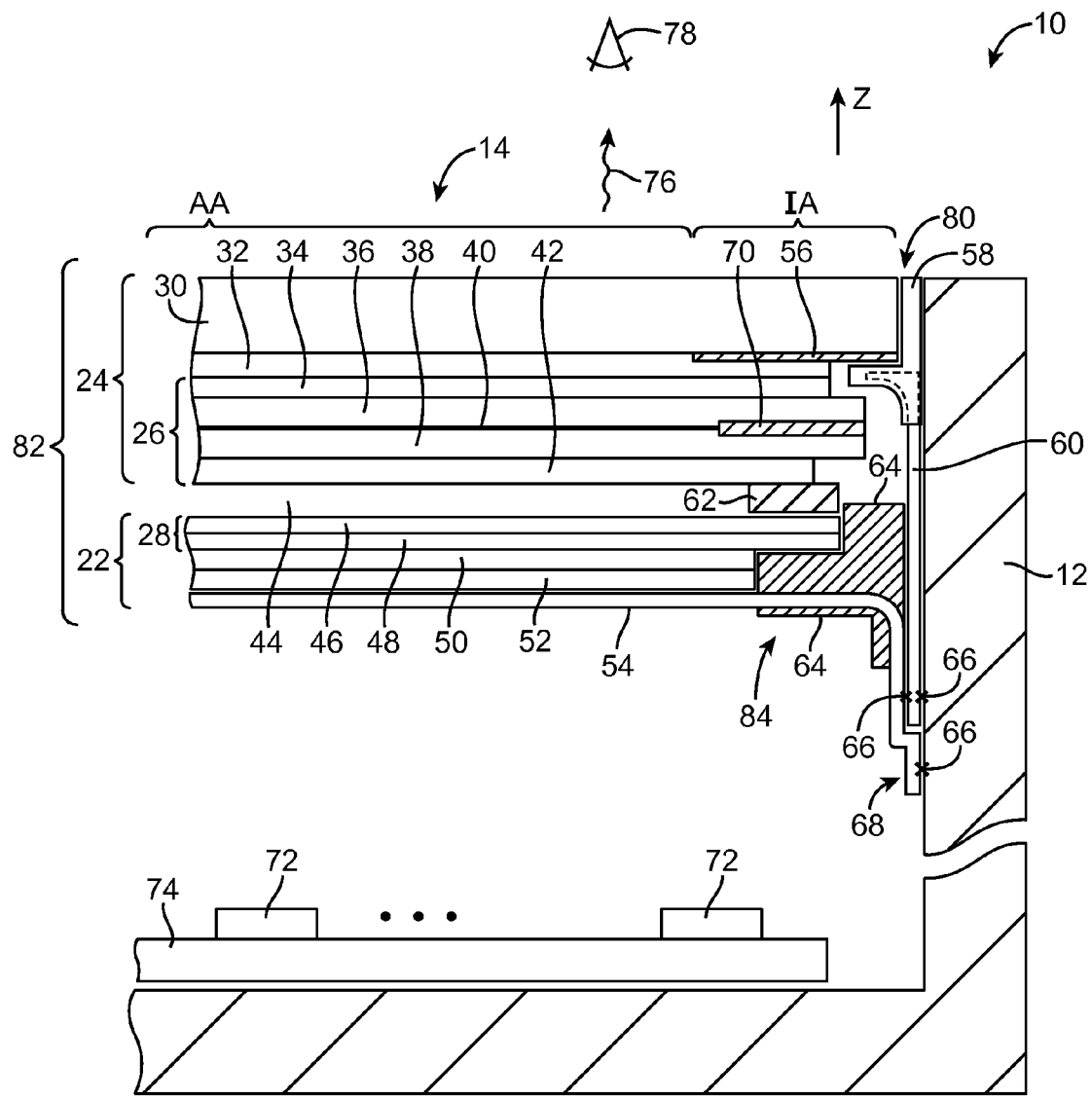
FIG. 2 is a cross-sectional side view of a portion of an electronic device with a display in accordance with an embodiment of the present invention.

A cross-sectional side view of device 10 and display 14 is shown in FIG. 2. As shown in FIG. 2, display 14 and additional components such as components 72 may be mounted in electronic device housing 12.

Electronic device housing 12 may be formed from plastic, metal, glass, ceramic, fiber-based composites, other materials, and combinations of these materials. As an example, housing 12 may include metal sidewall structures such as vertical metal walls or other suitable housing structures. The metal walls may run around the periphery of electronic device housing 12 and may sometimes be referred to as a peripheral metal band or peripheral conductive housing structures.

Components 72 may be electrical components such as integrated circuits, connectors, batteries, discrete devices such as resistors, capacitors, and inductors, switches, and other electronic devices. Components 72 may be mounted to one or more substrates such as substrate 74. Substrate 74 may be coupled to additional substrates in device 10 using connectors, cables, flexible printed circuit paths, and other interconnect pathways. Substrates such as substrate 74 may be formed from molded plastic, ceramic, glass, or printed circuits (as examples). For example, substrates such as substrate 74 may be formed from rigid printed circuit boards (e.g., printed circuits formed from rigid layers of material such as fiberglass-filled epoxy) or flexible printed circuits (e.g., flexible sheets of polyimide or other flexible layers of polymer).

Electrical components such as components 72 may be electrically connected to conductive paths in substrates such as substrate 74. The conductive paths in substrates such as substrate 74 may sometimes be referred to as lines, traces, or interconnects and may be formed from conductive materials such as metal (e.g., copper, gold, aluminum, etc.). Using these printed circuit paths, components 72 may be interconnected with each other and may be interconnected with other components in device 10 such as display 14.

Display 14 may include active display pixels in active area AA and may be devoid of active display pixels in inactive area IA. Display 14 may include layers such as display cover layer 30. Display cover layer 30 may be formed from a clear layer of glass, a transparent plastic layer, or other transparent material. Display cover layer 30 may have the shape of a planar rectangular member or may have other shapes such as shapes with a curved cross-sectional profile and/or a footprint with curved edges.

Display module 26 may be attached to the underside of display cover layer 30 using adhesive layer 32 (e.g., a layer of optically clear adhesive or other suitable adhesive). In inactive area IA, opaque masking material 56 may be formed on the underside of display cover layer 30. Opaque masking material 56 may be formed from an opaque material such as black ink, white ink, substances with colors other than black or white, metal, opaque metal oxides, combinations of these substances, or other opaque material. The layers of display module 26 may also be provided with a peripheral strip of opaque masking material such as opaque masking material 70.

Display module 26 may be a liquid crystal display module or may be a display module based on other display technologies. Touch screen functionality may be incorporated into display module 26 if desired (e.g., by providing display module 26 with an array of transparent capacitive touch sensor electrodes such as electrodes formed from indium tin oxide). In the FIG. 2 example, display module 26 is a liquid crystal display module having a layer of liquid crystal material such as liquid crystal layer 40. Liquid crystal layer 40 is sandwiched between an upper display layer such as color filter layer 36 and a corresponding lower display layer such as thin-film transistor layer 38.

Color filter layer 36 may be used to provide display 14 with the ability to display color images. Color filter layer 36 may have a substrate formed from clear glass, transparent plastic, or other clear substrate material. An array of color filter elements such as red, green, and blue polymer color filter elements may be formed on the underside of color filter layer 36.

Thin-film transistor layer 38 may have a substrate formed from a layer of clear glass, a sheet of transparent plastic, or other clear substrate layer. The upper surface of thin-film transistor layer 38 may have a layer of thin-film transistor circuitry that includes thin-film transistors and electrodes. Using the thin-film transistors, the electrodes may be used to adjust the strength of electric fields applied to the array of display pixels in active area AA.

Backlight unit 22 may be used to provide backlight 76 that travels upwards through display module 26 in direction Z to viewer 78. The layers of display module 26 such as color filter layer 36, thin-film transistor layer 38, and interposed liquid crystal layer 40 may be sandwiched between polarizer layers such as upper polarizer 34 and lower polarizer 42. During operation of display 14, adjustments to the electric fields supplied by the electrodes in thin-film transistor layer 38 can be used to create changes to liquid crystal layer 40 that rotate the polarization of light 76 by corresponding amounts. The rotation of the polarization of light 76 in combination with the presence of upper and lower polarizers 34 and 42 adjusts the amount of light 76 that is transmitted to viewer 78. This allows display 14 to be used to display images to viewer 78.

If desired, opaque masking material 70 may be provided between the substrates associated with color filter layer 36 and thin-film transistor layer 38. For example, opaque masking material may be provided on the underside of color filter layer 36.

Display module 26 may be attached to display cover layer 30 to form display module assembly 24. Display module assembly chassis structures 80 may be attached to display structures such as display cover layer 30 and/or display module 26 in display module assembly 24. For example, display module chassis structures 80 may be attached to display cover layer 30 and/or display module 26 using adhesive, fasteners, or other mounting structures and/or by configuring display module assembly chassis structures. Display module assembly chassis structures 80 may be formed from plastic, glass, ceramic, metal, fiber-based materials, other materials, or combinations of these materials. As an example, display module assembly chassis 80 may be formed by molding plastic ring 58 over metal legs 60. There may be any suitable number of legs 60 around the rectangular periphery of display 14. For example, there may be two, three, or more than three chassis legs 60 on each edge of display 14. Holes may be provided in legs 60 to accommodate screws or other fastening structures.

Display structures such as display cover layer 30, display module chassis 80, and display module 26, which form display module assembly 24, may sometimes be collectively referred to as a cover glass frame. During assembly operations, the structures of display module assembly 24 and the structures of backlight structures 22 may be assembled directly into device housing 12 without prior coupling of these components to form an assembly. If desired, display module assembly 24 and backlight unit 22 may also be assembled together to form a unitary structure such as display assembly 82 of FIG. 2 that is then mounted within housing 12.

Backlight structures 22, which may sometimes be referred to as a backlight unit, may include reflector 52 and light guide plate 50. Light guide plate 50 may be formed from a clear sheet of material such as a layer of transparent plastic. Light-emitting diodes or other light sources may be used to launch light into one or more of the peripheral edges of light guide plate 50. The light that is launched into light guide plate 50 in this way propagates laterally throughout light guide plate 50 due to the principal of total internal reflection. Light guide plate 50 may include pits, bumps, or other light scattering features to enhance light scattering in direction Z. Reflector 52, which may be formed from a sheet of white plastic or other reflective material may be used to increase backlight efficiency by reflecting rays of light that have escaped from light guide plate 50 in a downwards direction back upwards in direction Z.

Optical films 28 may be incorporated into backlight unit 22 to help improve the quality of the backlight produced by light guide plate 50 and reflector 52. Optical films 28 may, as an example, include one or more, two or more, or three or more layers such as layers 48 and 46 for improving the homogeneity and directionality of emitted backlight 76. Examples of optical films 28 include diffuser films and brightness enhancement films (sometimes referred to as turning films or prism films).

Backlight unit layers such as optical films 28, light guide plate 50, and reflector 52 may be mounted within a chassis such as backlight unit chassis 84. Backlight unit chassis 84 may be formed from plastic, metal, fiber-based composites, glass, ceramic, or other suitable material. As an example, backlight unit chassis 84 may be formed from one or more metal structures such as metal plate 54 and one or more plastic structures such as plastic chassis structure 64. Plastic chassis structures 64 may be attached to metal plate 54 using adhesive, screws or other fasteners, or other attachment mechanisms. As an example, plastic chassis structures 64 may be molded to metal plate 54 using plastic molding equipment such as plastic injection molding equipment.

After forming backlight unit chassis 84, the layers of backlight unit 22 may be assembled into backlight unit chassis 84. As an example, backlight unit chassis 84 may be configured to form a recessed rectangular support structure (e.g., a rectangular recess) into which display backlight unit layers such as reflector 52, light guide plate 50, and optical films may be placed in succession. During backlight unit assembly operations, backlight unit chassis 84 may be maintained in an upright position (as shown in FIG. 2) without flipping over backlight unit chassis 84.

Device 10 may be provided with structural strength and rigidity using internal sheet metal structures. These internal sheet metal structures may individually or collectively span the width (and, if desired, the length) of housing 12. The internal sheet metal structures may, as an example, be formed from one or more thin metal plate structures (e.g., a metal sheet with a thickness of less than 1 mm, less than 0.5 mm, or less than 0.3 mm) that run across device 10 in a position that is vertically roughly midway between the outer surface of display cover layer 30 and the rear surface of housing 12. Because of this illustrative position in the middle of device 10, the internal sheet metal structures that are used in providing device 10 with structural support may sometimes be referred to as midplate structures, a housing midplate, or a housing midplate member. If desired, the housing midplate may be formed from multiple stamped metal structures that are attached to each other through overmolded plastic structures, provided that the resulting midplate is able to provide device 10 with structural support. Once the midplate has been properly attached to housing structures such as the left and right housing walls of housing 12, the tendency of housing 12 to twist during use will be minimized.

To avoid incorporation of excessively bulky structures into device 10, device 10 may be provided with a midplate that is also used as part of backlight unit 22. In particular, metal plate 54 may serve as both a housing midplate that stabilizes device 10 and housing 12 against undesirable twisting and as the lower support surface for the layers of display backlight unit 22 in display backlight unit chassis 84. By using metal plate 54 both as a housing midplate and as a part of backlight unit chassis 84, the thickness of device 10 can be reduced and/or additional components 72 can be incorporated into the interior of device 10 without need to adjust the overall thickness of device 10.

As shown in FIG. 2, display module chassis 80 and the other portions of display module assembly 24 may be attached to midplate 54 of display backlight unit 22 and to housing 12 using attachment structures 66. Attachment structures 66 may be welds, solder, screws, clips, rivets, or other fasteners, overmolded plastic, or other connection mechanisms. Attachment structures 66 such as welds, solder, screws, clips, rivets, or other fasteners, overmolded plastic, or other connection mechanisms may also be used in mounting display unit structures such as midplate 54 in chassis 84 of backlight unit 22 to housing 12. For example, portions 68 of the bend edges of midplate 54 may be attached to housing 12 using attachment structures 66. If desired, one or more screws or other attachment structures 66 may be used to attach metal legs 60 of chassis 80 to downwardly bent peripheral edge portions of midplate 54 and welds or other attachment structures 66 may be used to attach portions 68 of midplate 54 to vertical metal housing sidewalls walls in housing 12 or other metal housing structures. These are merely illustrative arrangements for attaching assembly 24 and separate display backlight unit 22 into electronic device housing 12. Other mounting arrangements may be used, if desired.

Figure 3:
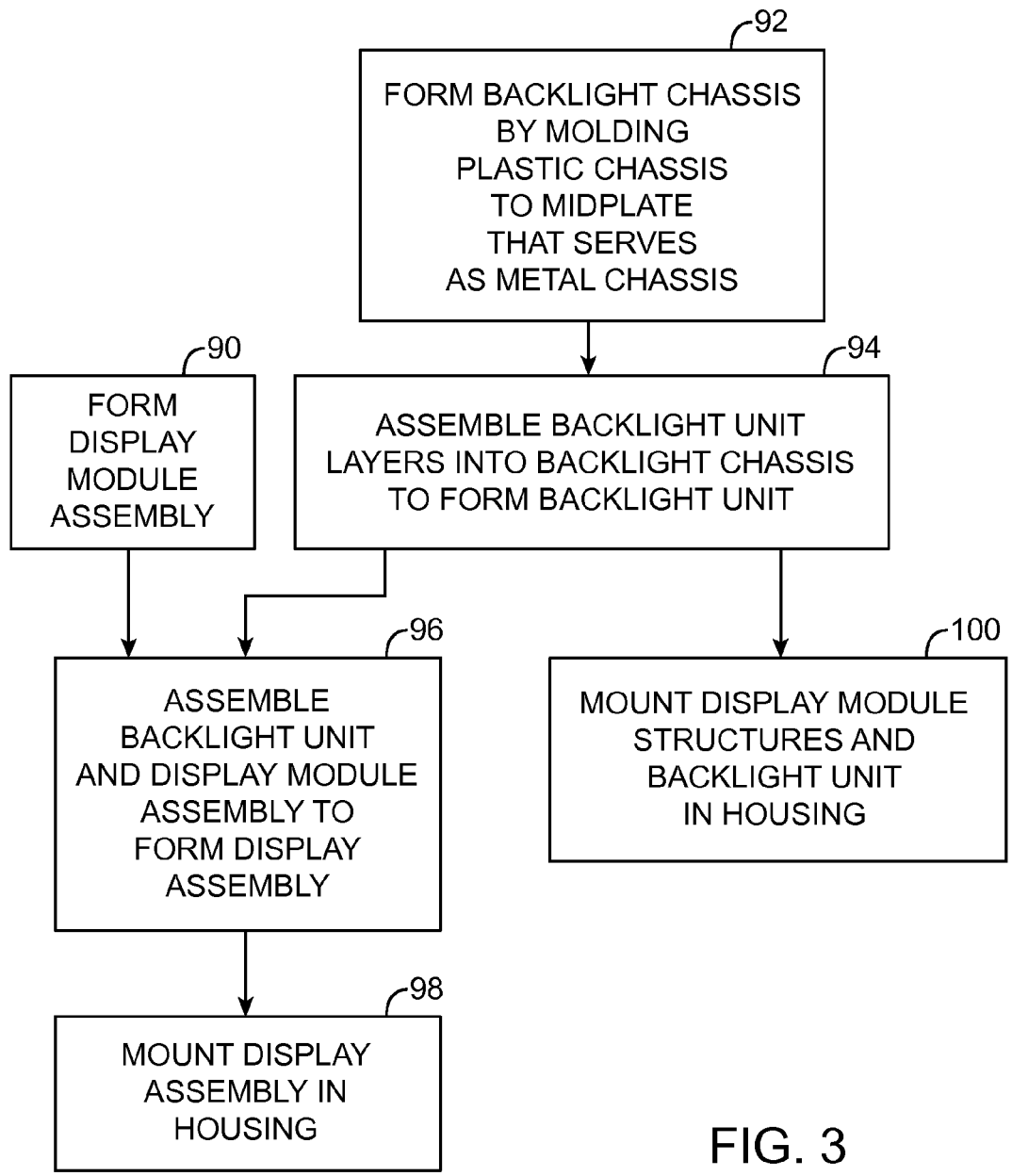
FIG. 3 is a flow chart of illustrative steps involved in forming electronic devices with backlit displays in accordance with an embodiment of the present invention.

A flow chart of illustrative steps involved in assembling display module and backlight unit structures to form an electronic device such as device 10 of FIG. 2 is shown in FIG. 3. At step 92, backlight chassis 84 may be formed by attaching chassis structures such as chassis structures 64 to chassis structures such as planar support structure 54. For example, plastic chassis structures 64 may be injection molded over portions of metal midplate 52. Midplate 54 may serve both as a planar support structure for the layers of material mounted in the rectangular recess in backlight unit 22 and as a planar structural housing member that spans the width of housing 12 from sidewall to sidewall.

Midplate 54 may have a rectangular outline with bent edge portions, leg-shaped tabs with screw hole openings and/or other structures that facilitate attachment of midplate 54 within housing 12 and attachment of backlight unit 22 to display module assembly 24 to form display assembly 82. Chassis structures 64 may have the shape of a rectangular ring with a rectangular outer periphery that fits within a rectangular housing interior defined by a corresponding rectangular inner sidewall surface of housing 12. The center of chassis structures 64 may have a rectangular opening into which rectangular backlight unit layers may be placed such as a rectangular reflector 52, a rectangular light guide plate 50, and rectangular optical films 28. The lateral dimensions of the backlight unit layers need not all be the same. For example, reflector 52 and light guide plate 50 may have a smaller rectangular footprint than optical films 28, as shown in FIG. 2.

After forming backlight unit chassis 84, backlight unit layers such as layers 52, 50, and 28 may be mounted within the rectangular recess formed by chassis structures 84, thereby forming backlight unit 22.

The layers of display 14 such as display cover layer 30 and display module 26 and the structures of backlight unit 22 may be mounted directly into housing 12 to form device 10 (step 100). When mounting backlight unit 22 within housing 12, attachment structures 66 such as welds, screws, or other structures may be used in attaching midplate 52 of backlight unit 22 to the inner surface of a metal electronic device housing wall or other portion of housing 12. Adhesive layer 32 may be used in attaching display cover layer 30 and display module 26.

If desired, display module assembly 24 may be formed by attaching display module 26 to display cover layer 30 with adhesive 32 and by attaching a separate backlight such as backlight unit 22 to display module assembly 24 to form display module 82 before the structures of display assembly 82 are mounted in housing 12. As shown in FIG. 2, display module assembly 24 may be formed at step 90 by attaching display module 26 to display cover layer 30 with adhesive 32 and by incorporating display module assembly chassis 80 into display module assembly 24 so that display module assembly chassis 80 extends around the periphery of display cover layer 30 and display module 26 of FIG. 2. After forming display module assembly 24 at step 90, backlight unit 22 and display module assembly 24 may be assembled to form display assembly 82 at step 96.

In forming display assembly 82, backlight unit 22 may be attached to display module assembly 24 using attachment mechanisms 66 (e.g. screws or other features that attach metal portion 60 of display module assembly chassis 80 to the bent edge portion of midplate 54 in backlight unit chassis 84).

After display assembly 82 has been formed using screws or other fasteners (e.g., screws that pass through holes in downwardly protruding metal chassis structures), display assembly 82 may be mounted within housing 12 to form device 10. For example, attachment mechanisms 66 such as welds or other attachment mechanisms may be used in attaching bent metal edge portions 68 of midplate 52 to metal walls in housing 12.

During the operations of step 96 (and, if desired, during the assembly operations of step 100 in which the layers of display 14 are formed directly in housing 12), a layer of material such as foam gasket 62 may be interposed between display module 26 and backlight unit 22 (e.g., without interposing any adhesive between backlight unit 22 and display module 26). Foam gasket 62 may have the shape of a rectangular ring (as an example) and may be formed from a material such as a semi-closed-cell polymer foam. The presence of spacer structures such as foam gasket 62 may create an air gap such as gap 44 that helps prevent undesired contact between layers 28 of backlight unit 22 and the lowermost layer (e.g., polarizer 42) of display module 26. Foam 62 may have a relatively low compressibility, so that the layers of display 14 are not forced apart following assembly. For example, foam 62 may exhibit a restoring force of less than 4 N/cm2 when foam 62 is compressed within display 14 as shown in FIG. 2.

The foregoing is merely illustrative and various modifications can be made by those skilled in the art without departing from the scope and spirit of the described embodiments. The foregoing embodiments may be implemented individually or in any combination.

What is claimed is:

1. A method of forming an electronic device, comprising:
    forming a display module assembly by attaching a glass display cover layer to a liquid crystal display module;
    forming a backlight unit having a backlight unit chassis, wherein the backlight unit chassis comprises plastic chassis structures molded over a metal midplate member;
    attaching the backlight unit to the display module assembly to form a display assembly; and
    mounting the display assembly in an electronic device housing.

2. The method defined in claim 1 wherein forming the backlight unit comprises forming the backlight unit at least partly from the metal midplate member.

3. The method defined in claim 2 wherein attaching the liquid crystal display module to the glass display cover layer comprises attaching the liquid crystal display module to the glass display cover layer with a layer of adhesive.

4. The method defined in claim 3 wherein the display module assembly includes a display module assembly chassis and wherein assembling the backlight unit and the display module assembly comprises using screws to attach the metal midplate member in the backlight unit and the display module assembly chassis.

5. The method defined in claim 1 wherein forming the display module assembly comprises incorporating a display module assembly chassis into the display module assembly.

6. The method defined in claim 5 wherein assembling the backlight unit and the display module assembly to form the display assembly comprises attaching the display module assembly chassis to the backlight unit chassis.

7. The method defined in claim 6 wherein mounting the display assembly in the electronic device housing comprises attaching the backlight unit chassis to walls in the electronic device housing.

8. The method defined in claim 7 wherein attaching the backlight unit chassis to the walls in the electronic device housing comprises attaching the metal midplate member to the walls in the electronic device housing.

9. A method of forming an electronic device, comprising:
    forming a display backlight unit chassis by molding plastic chassis structures over a metal midplate member;
    forming a display backlight unit from the display backlight unit chassis;
    attaching the metal midplate member to walls in an electronic device housing;

placing a foam gasket on the display backlight unit so that the display backlight unit is interposed between the metal midplate member and the foam gasket; and mounting a display module in the electronic device housing such that the foam gasket is interposed between the display module and the display backlight unit, wherein the foam gasket surrounds an air gap that separates the display backlight unit and the display module.

10. The method defined in claim 9 wherein forming the display backlight unit comprises:

mounting a reflector in the display backlight unit chassis;

placing a light guide plate on top of the reflector without flipping over the display backlight unit chassis; and placing optical films on top of the light guide plate without flipping over the display backlight unit chassis.

11. The method defined in claim 10 wherein mounting the display module comprises mounting a liquid crystal display module in the electronic device housing.

12. Apparatus, comprising:

a backlight unit;

a display module assembly having an active area and an inactive area, wherein the display module assembly is formed from a display cover layer that is attached to a display module and overlaps the active area and the inactive area;

a foam gasket interposed between the backlight unit and the display module assembly, wherein the foam gasket surrounds an air gap that separates the backlight unit and the display module assembly; and a housing in which the backlight unit, the foam gasket, and the display module assembly are mounted.

13. The apparatus defined in claim 12 wherein backlight unit comprises a metal midplate that provides structural support for the housing.

14. The apparatus defined in claim 13 wherein the backlight unit comprises:

a backlight unit chassis that includes the metal midplate; and a light guide plate in the backlight unit chassis.

15. The apparatus defined in claim 14 wherein the backlight unit chassis comprises plastic chassis structures that are molded over portions of the metal midplate.

16. The apparatus defined in claim 15 wherein the housing comprises metal walls, the apparatus further comprising welds that attach the metal midplate to the metal walls.

17. The apparatus defined in claim 16 wherein the foam gasket comprises a polymer foam.

18. The apparatus defined in claim 17 wherein the display module comprises a liquid crystal display layer.

19. The apparatus defined in claim 18 wherein the display module assembly further comprises a display module assembly chassis wherein at least part of the display module assembly chassis is interposed between the display cover layer and the display module.

* * * * *